(12) United States Patent
Naik et al.

(10) Patent No.: US 10,855,411 B2
(45) Date of Patent: Dec. 1, 2020

(54) VOICE QUALITY OVER BLUETOOTH LINK BY ENHANCING SCHEDULER BEHAVIOR FOR RETRANSMISSION FRAMES

(71) Applicant: APPLE INC., Cupertino, CA (US)

(72) Inventors: Anil G. Naik, Santa Clara, CA (US); Yevgeny Bezman, Edomim (IL); Igor Shvorin, Herzliya (IL); Alon Paycher, Beit Hananya (IL)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 16/124,768

(22) Filed: Sep. 7, 2018

(65) Prior Publication Data

US 2020/0083993 A1   Mar. 12, 2020

(51) Int. Cl.

| | |
|---|---|
| *H04W 4/00* | (2018.01) |
| *H04L 1/18* | (2006.01) |
| *H04M 1/253* | (2006.01) |
| *H04W 28/04* | (2009.01) |
| *H04W 4/80* | (2018.01) |
| *H04L 5/00* | (2006.01) |

(52) U.S. Cl.
CPC .......... *H04L 1/1887* (2013.01); *H04L 5/0055* (2013.01); *H04M 1/2535* (2013.01); *H04W 4/80* (2018.02); *H04W 28/04* (2013.01)

(58) Field of Classification Search
USPC ....... 370/329, 342, 209, 335, 320, 341, 347, 370/348, 352, 229, 278, 322, 330, 349, 370/403, 432, 462
See application file for complete search history.

(56) References Cited

U.S. PATENT DOCUMENTS

| | | | | |
|---|---|---|---|---|
| 2002/0105929 | A1* | 8/2002 | Chen | H04B 1/7073 370/335 |
| 2007/0230416 | A1* | 10/2007 | Harris | H04L 1/1867 370/338 |
| 2008/0247413 | A1* | 10/2008 | Ono | H04L 1/0083 370/432 |
| 2011/0103315 | A1* | 5/2011 | Camp, Jr. | H04L 1/1854 370/329 |
| 2017/0070909 | A1* | 3/2017 | Kim | H04L 65/4023 |
| 2019/0387382 | A1* | 12/2019 | Wojcieszak | H04W 72/1215 |

* cited by examiner

*Primary Examiner* — Phuongchau Ba Nguyen
(74) *Attorney, Agent, or Firm* — Fay Kaplun & Marcin, LLP

(57) ABSTRACT

A source device connected to a sink device over a first wireless connection. The source device identifies a frame for retransmitting a voice packet associated with a real time application from the source device to the sink device, determines that a precedent operation is scheduled for the frame, delays the precedent operation to a subsequent frame, following the retransmitting of the voice packet and scheduling a retransmission operation for retransmitting the voice packet during the frame.

20 Claims, 2 Drawing Sheets

VOICE QUALITY OVER BLUETOOTH LINK BY ENHANCING SCHEDULER BEHAVIOR FOR RETRANSMISSION FRAMES

BACKGROUND INFORMATION

An electronic device may be configured with a variety of different wireless communications capabilities. For example, the electronic device may be capable of establishing a wireless connection with a cellular network. The cellular network may be of any type of network, such as Long Term Evolution (LTE), 3G, 4G, 5G, etc. In another example, the electronic device may be capable of establishing a wireless connection with a WiFi network. The WiFi network may also be of any type, such as a home WiFi network, a public access point, a HotSpot, etc. In a further example, the electronic device may be capable of establishing a direct wireless connection with another electronic device (e.g., a peer connection). This direct connection may be made using a short-range or mid-range communication protocol, such as a Bluetooth or WiFi connection.

The electronic device may be capable of utilizing these various communication capabilities, or a combination thereof, for different applications and at varying times. For example, a real time voice application such as voice over LTE (VoLTE) may be used to establish an audio connection between a first electronic device and another electronic device over the LTE network. In outputting audio of the VoLTE call at the first electronic device, the Bluetooth connection may be used between the first electronic device (e.g., a smartphone) and a second electronic device (e.g., an earbud), where the first electronic device is a source device and the second electronic device is a sink device. The Bluetooth connection may utilize hardware based firmware operations that take precedence over other operations including transmission of voice packets from the source device to the sink device. When such a scenario arises, the efficiency of the voice packet transmission may be adversely affected, particularly when retransmission attempts are to be used, but are prevented due to the precedent operations. For example, a scheduling conflict between voice packet retransmissions and performing the precedent operations (when both are scheduled in the same Bluetooth frame) results in the precedent operation being scheduled and the voice packet retransmission being canceled. Thus, the voice packet may be dropped, which may result in a perceptible audio glitch.

SUMMARY

In one exemplary embodiment, a method is performed by a source device connected to a sink device over a first wireless connection. The method includes identifying a frame for retransmitting a voice packet associated with a real time application from the source device to the sink device, determining that a precedent operation is scheduled for the frame, delaying the precedent operation to a subsequent frame, following the retransmitting of the voice packet and scheduling a retransmission operation for retransmitting the voice packet during the frame.

In a further exemplary embodiment, a source device having a transceiver and a processor is described. The transceiver is configured to establish a connection to a sink device over a first wireless connection. The processor is configured to identify a frame for retransmitting a voice packet associated with a real time application from the source device to the sink device, determine that a precedent operation is scheduled for the frame, delay the precedent operation to a subsequent frame, following the retransmitting of the voice packet and schedule a retransmission operation for retransmitting the voice packet during the frame.

In a still further exemplary embodiment an integrated circuit configured for use in a source device connected to a sink device over a first wireless connection is described. The integrated circuit includes circuitry configured to identify a frame for retransmitting a voice packet associated with a real time application from the source device to the sink device, circuitry configured to determine that a precedent operation is scheduled for the frame, circuitry configured to delay the precedent operation to a subsequent frame following the retransmitting of the voice packet and circuitry configured to schedule a retransmission operation for retransmitting the voice packet during the frame.

DETAILED DESCRIPTION

Figure 1:
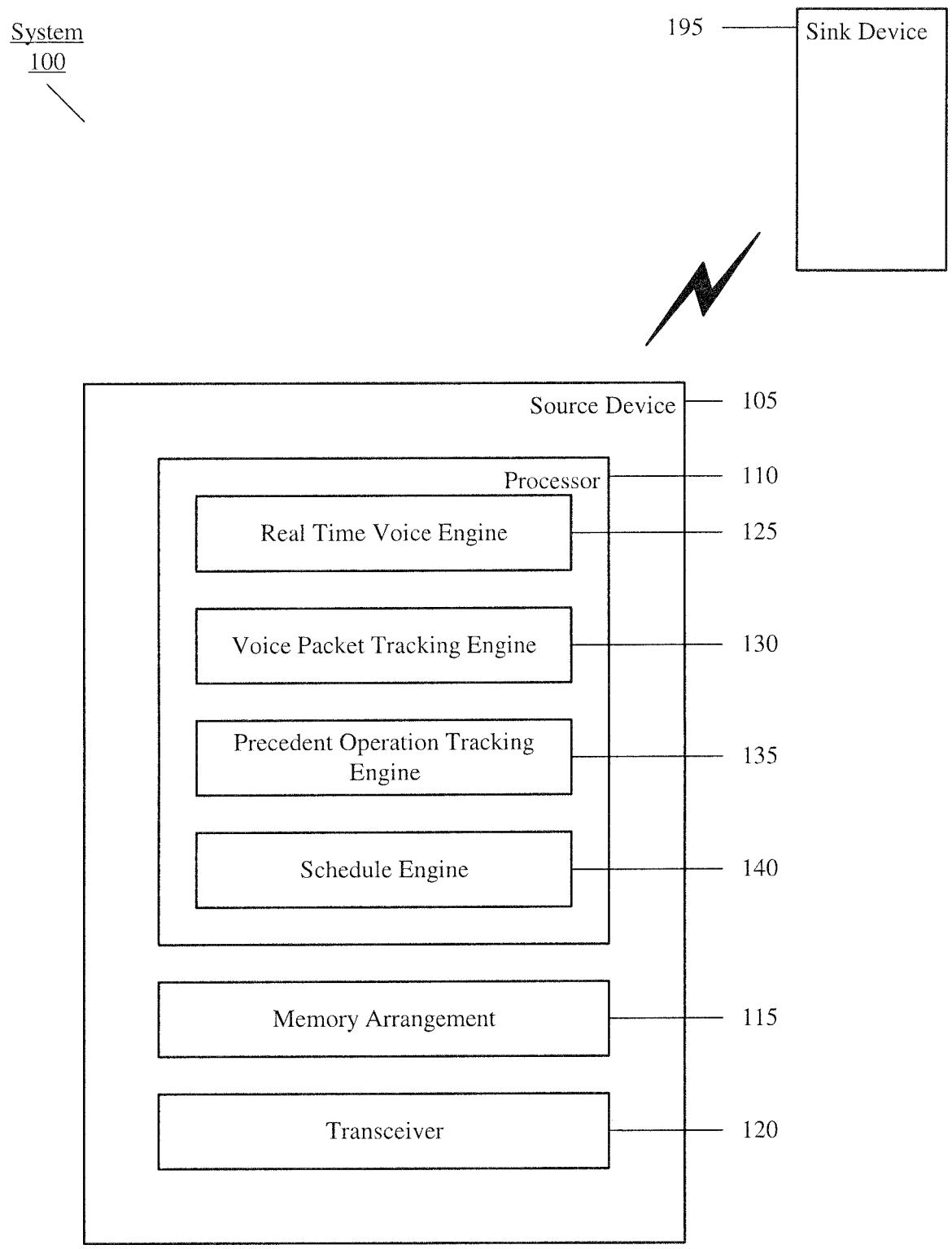
FIG. 1 shows an example system in which a source device dynamically schedules voice packet retransmissions and precedent operations according to various exemplary embodiments described herein.

The exemplary embodiments may be further understood with reference to the following description and the related appended drawings, wherein like elements are provided with the same reference numerals. The exemplary embodiments are related to a device, system, and method for dynamically scheduling voice packet retransmissions and precedent operations during a real time voice application (or any application that includes transmitting audio packets from a source device to a sink device). In other embodiments, the real time application can be any other streaming application (e.g., media, music, etc.) and the retransmissions can be associated with packets of streaming content (e.g., media, audio, etc.).

For example, a first user may be associated with a first electronic device and a second electronic device. The first user may be participating in a voice call with a second user associated with a third electronic device. The first and third electronic devices may be connected to a network over which the voice call is performed. The first and second electronic devices may be connected to each other over a short-range communication protocol, such as a Bluetooth connection. The exemplary embodiments provide a mechanism that schedules operations in a dynamic manner for each frame while the real time voice application is in use. As will be described below, when a precedent operation is scheduled to be performed in a given frame, but the given frame is also to be used for a voice packet retransmission, the precedent operation may be postponed until a future frame, e.g., representing a next available opportunity.

Initially, the exemplary embodiments are described herein with regard to a Bluetooth connection. However, the use of the Bluetooth connection and corresponding operations associated with the Bluetooth connection are only exemplary. The exemplary embodiments may be modified to be used with any type of wireless connection, particularly a peer to peer (P2P, D2D, etc.) connection, and corresponding operations associated with the wireless connection. The exemplary embodiments are described herein with regard to precedent operations associated with the Bluetooth connection. As will be described below, these precedent operations may be firmware related activities programmed into a Bluetooth chipset used to establish and/or maintain the Bluetooth connection. However, these types of precedent operations are only exemplary. The exemplary embodiments may be modified to be used with any type of precedent operation that may take priority and cause a retransmission scheduling attempt to be canceled or postponed.

The exemplary embodiments are also described herein with regard to an electronic device such as a user equipment (UE). However, the electronic device as described herein is only exemplary. The exemplary embodiments may be utilized with any device that may establish one or more connections as well as one or more types of connections (e.g., to a network, to a device, etc.) as well as be configured with the hardware, software, and/or firmware to establish one or more connections. Therefore, the electronic device as described herein is used to represent any device capable of establishing these connections.

The exemplary embodiments are further described herein with regard to an electronic device that simultaneously (or contemporaneously) utilizes a network connection (e.g., to a Long Term Evolution (LTE) network) and a Bluetooth connection. However, the use of the Bluetooth connection and an additional connection are only exemplary. The exemplary embodiments may be implemented when the Bluetooth connection between two electronic devices is established, regardless of whether one of the electronic devices has also established one or more other connections.

The exemplary embodiments are presented in the context of a source device and a sink device of a Bluetooth connection being in use, while a voice call is in progress through a real time voice application. However, this context is only an example and other implementations using the disclosed techniques are possible. The source device may execute the real time voice application using a network connection. Output audio for the real time voice application may be transmitted as voice packets from the source device to the sink device over the Bluetooth connection. When receiving the voice packets, the sink device may acknowledge proper receipt with an ACK or indicate receipt failure with a NACK (e.g., explicit negative indication) when the voice packet is not received. In addition, the source device may recognize an implicit negative indication that the voice packet is not properly received when one or more certain conditions are detected (e.g., a time out).

When a negative indication (e.g., explicit or implicit) is determined, the source device may be configured to retransmit the voice packet over the Bluetooth connection (as per the Bluetooth Specification). For example, for a Bluetooth voice connection, retransmission of a voice packet may be attempted up to two times (when necessary) before the voice packet is dropping by the source device. The Bluetooth voice connection may utilize a maximum number of retransmission attempts (e.g., two attempts) owing to the voice traffic being in real time. For example, the retransmission limit may be imposed because a prolonged attempt to retransmit a voice packet may impact the real time aspect, e.g., by injecting latency into the packet flow. If the sink device receives the packet within these three transmission attempts, the corresponding audio of the voice packet may be decoded and presented. The transmission attempts of the voice packet may be scheduled in the firmware of the Bluetooth chipset along a series of frames. Thus, in a first Bluetooth frame, the voice packet may be transmitted; in a second, ensuing Bluetooth frame (assuming a negative indication), the voice packet may be retransmitted; and in a third, ensuing Bluetooth frame (assuming a negative indication), the voice packet may be retransmitted.

The Bluetooth connection may also utilize firmware related operations associated with establishing the Bluetooth connection as well as detecting a presence of one or more sink devices to which the Bluetooth connection may be established by the source device. For example, a page scan operation (e.g., to establish the Bluetooth connection), an advertisement operation (e.g., to broadcast to sink devices), and/or an advertisement scan operation (e.g., to detect sink devices) may be utilized. These firmware related operations, when they arise, may take precedence over one or more other types of operations, particularly voice packet retransmission operations. The firmware related operations are hereby referred to herein as "precedent operations." Thus, the precedent operations may also be scheduled according to the series of frames for the Bluetooth connection where, under conventional operations, the coincident use of a frame results in the precedent operation having priority over the retransmission operation. Accordingly, whenever such a coincident event occurs where a precedent operation is scheduled for a frame, but a retransmission operation also is requested to be performed in the frame, the retransmission operation (e.g., of a voice packet) is dropped for that frame. Retransmission of the voice packet is then attempted, if feasible, in a subsequent opportunity or frame. If no such opportunity exists, the voice packet is dropped entirely (at the source device).

With regard at least to the exemplary embodiments, there may be various reasons that the Bluetooth connection has one or more degraded Bluetooth radio frequency (RF) conditions. In a first example, when the user of the source and sink devices is walking or running outdoors, there may be fewer multipath components, thereby preventing the sink device from receiving good signals from the source device. In a second example, the source and sink devices may be located in a high interference region, such as an area with a significant number of WiFi 2.4G interference. In a third example, the source and sink devices may be poorly situated with respect to each other, such as the source device being located on a left, lower side of the user and the sink device being located on a right, upper side of the user, which may result in blocked signals and increased overall RF impact on the sink device.

In the above scenarios, and generally under poor Bluetooth RF conditions, packets may not be received or may be unusable a significant amount of the time. For example, 40-60% of the voice packets bound for the sink device may not be received or may not be able to be decoded. Under such scenarios, the source device is frequently scheduling retransmission operations for the voice packets that were not successfully acknowledged. However, again, the source device may only be provided a limited number of retransmission attempts for a given voice packet. The increased scheduling of retransmission attempts may also be impacted in a significant way when the precedent operations disrupt the retransmission operations, thereby preventing retransmissions from being performed. The reduced number of retransmission operations being performed (or scheduled) as a result of the precedent operations may impact the overall audio quality, and thus the experience perceived by the user, e.g., during the voice call.

FIG. 1 shows an example system 100 in which a source device 105 dynamically schedules voice packet retransmissions and precedent operations according to various exemplary embodiments described herein. The system 100 includes a source device 105 that communicates over a Bluetooth connection with a sink device 195. For example, the source device 105 may be a portable device (e.g., a mobile computing device, a mobile phone, a personal computer, a cellular phone, a smartphone, a tablet computer, a phablet, a laptop, a VoIP phone, a personal digital assistant, an embedded device, a wearable device, a Cat-M device, a Cat-M1 device, a MTC device, an eMTC device, another type of an Internet of Things (IoT) device, etc.) or a stationary device (e.g., a desktop terminal, fixed computing device, etc.). The sink device 195 may be another portable or stationary device (e.g., another smartphone, a wireless earpiece, a wireless headset, a wireless speaker, a wireless display device, a wearable, a hands-free headset, an intercom, a fitness tracking device, a sensor, an automobile sound system, etc.). In establishing short-range communications links such as Bluetooth connections, the source device 105 and the sink device 195 may include the necessary hardware, software, and/or firmware to perform conventional operations as well as operations according to the exemplary embodiments.

There may be a variety of different arrangements between the source device 105 and the sink device 195. In a first example, the source device 105 may be a smartphone and the sink device 195 may be a single receiver headset (e.g., wireless headphones with internal circuitry to connect left and right audio output components). In a second example, the source device 105 may be a smartphone and the sink device 195 may be a dual receiver headset (e.g., wireless ear buds with a left ear bud and a right ear bud that are separate from one another). In a third example, the source device 105 may be a smartphone and the sink device 195 may be a wearable (e.g., a watch), one or more speakers, etc. As will be described in further detail below, the wearable may operate in various modes such as a Bluetooth mode, a cellular mode, or a combination thereof. In a fourth example, the source device 105 may be a wearable and the sink device 195 may be a headset (e.g., single or dual receiver). Accordingly, any electronic device may be configured as the source device 105 or the sink device 195 under different operating conditions.

In the system including the source device 105 and the sink device 195, short-range communication links may be established in an inter-operative manner (e.g., between the source device 105 and the sink device 195) or an intra-operative manner (e.g., between components of the sink device 195). As noted above, the sink device 195 may be a single receiver electronic device such as headphones. With a single receiver electronic device, there may be a Bluetooth connection established between the source device 105 and the sink device 195. Alternatively, the sink device 195 may be a dual receiver electronic device. For example, as ear buds, the sink device 195 may include a primary audio bud and a secondary audio bud. With a dual receiver electronic device, there may be a first Bluetooth connection established between the source device 105 and the primary audio bud of the sink device 195. Further, a second Bluetooth connection may be established, e.g., between the primary audio bud and the secondary audio bud of the sink device 195. The secondary audio bud may also be configured to perform an eavesdrop or snoop operation with respect to the first Bluetooth connection, e.g., to receive communications sent over the first Bluetooth connection between the source device 105 and the primary audio bud.

The source device 105 and the sink device 195 may also operate on a variety of different frequencies or channels (e.g., ranges of contiguous frequencies). Specifically, the source device 105 and the sink device 195 may operate over channels corresponding to a Bluetooth connection, a cellular connection, a WiFi connection, etc. Accordingly, the source device 105 and the sink device 195 may include components that enable different radio access technologies and communication protocols. As shown in FIG. 1, the source device 105 may include a processor 110, a memory arrangement 115, and a transceiver 120. The source device 105 may also include one or more additional components, such as a display, an input/output (I/O) device, a portable power supply, an audio I/O device, and/or other components. The sink device 195 may include similar, additional, and/or different components, e.g., to permit it to interoperate with the source device 105.

The processor 110 may be configured to execute a plurality of engines of the source device 105. For example, the engines may include a real time voice engine 125, a voice packet tracking engine 130, a precedent operation tracking engine 135, and a schedule engine 140. The real time voice engine 125 may be configured to execute a real time voice application that enables a user of the source device 105 to communicate in real time with another user utilizing a different electronic device. The voice packet tracking engine 130 may be configured to track when voice packets are to be transmitted from the source device 105 to the sink device 195 and also track results of transmitting these voice packets. The precedent operation tracking engine 135 may be configured to track when precedent operations are to be performed based on, e.g., the firmware instructions. The schedule engine 140 may be configured to dynamically select when an operation is scheduled in a given Bluetooth frame, e.g., based on the output of the voice packet tracking engine 130 and/or the precedent operation tracking engine 135.

The above identified engines, each being an application (e.g., a program) executed by the processor 110, are only exemplary. The engines may also be represented as components of one or more multifunctional programs, a separate incorporated component of the source device 105 or may be a modular component coupled to the source device 105, e.g., an integrated circuit with or without firmware. For example, the engines may be implemented in a variety of manners in hardware, software, firmware, or a combination thereof. In addition, in some electronic devices, the functionality described for the processor 110 may be split among multiple processors (e.g., a baseband processor and an applications processor). The exemplary embodiments may be implemented in any of these or other configurations of an electronic device.

The memory arrangement 115 may be a hardware component configured to store data related to operations performed by the source device 105. Specifically, the memory arrangement 115 may store information associated with transmitting operations (e.g., at which frame the transmitting operation is to be performed, a result of a transmitting operation, etc.) as well as information associated with precedent operations (e.g., at which frame the precedent operation is to be performed). The transceiver 120 may be a component of the source device 105 that enables communication with one or more other devices over one or more communication pathways. As the exemplary embodiments relate to the source device 105, which is capable of a plurality of different types of wireless connections, the transceiver 120 may be equipped with one or more radios that are capable of performing wireless communications over a plurality of different wireless connections, including any/all of Bluetooth connections, cellular connections, WiFi connections, GPS, etc.

The exemplary embodiments are related to scheduling retransmission operations and precedent operations. The exemplary embodiments provide a mechanism for prioritizing packet scheduling by the Bluetooth hardware. For purposes of the exemplary embodiments, the precedent operations are prioritized over the retransmission operations. Thus, an initial transmission operation (or opportunity) may have priority over one or more precedent operations. However, one or more retransmission operations (or opportunities) may be prioritized lower than the precedent operations. However, this priority scheme is only exemplary. For example, in some implementations, one or more precedent operations may also be prioritized over the initial transmission operation or the priority scheme may consider whether successive transmission opportunities have been skipped. In other examples, the precedent operations and the (re)transmission operation may each represent any operation in which a first operation has a higher priority than a second operation, such that when both the first and second operations are scheduled at the same frame, the first operation has priority and is performed.

As described above, the real time voice engine 125 may execute a real time voice application that enables a user of the source device 105 to communicate in real time with another user (hereinafter "called party") utilizing a different electronic device (hereinafter "called device"). For illustrative purposes, the real time voice application may be used for an audio only call, where audio data is communicated between the source device 105 and the called device. However, those skilled in the art will understand that the exemplary embodiments also may be utilized for a video call in which image data and audio data are communicated between the source device 105 and the called device. For example, the real time voice application may relate to the audio portion of the video call. The exemplary embodiments may also be utilized in transmitting image packets from the source device 105 to the sink device 195 in a substantially similar manner as transmitting voice packets, assuming precedent operations have priority over retransmission of image packets. Discussion of the exemplary embodiments in the context of real time applications is only exemplary. The techniques also may be modified for and/or implemented with non-real time applications.

The real time voice application may be implemented in a variety of manners. For example, the real time voice application may be a voice over LTE (VoLTE) application where voice data is exchanged over a cellular connection established by the source device 105 to a LTE network. In another example, the real time voice application may be a WiFi Calling application where voice data is exchanged over a WiFi connection established by the source device 105 to a WiFi network. In a further example, the real time voice application may be a proprietary calling application using a cellular network or a WiFi network.

According to an exemplary implementation, the real time voice application executed by the real time voice engine 125 may utilize one or more voice calling features that utilize a corresponding packet format and utilize a corresponding audio codec for the voice packets, so that audio data may be transmitted from the source device 105 to the sink device 195 over the Bluetooth connection. For example, the packet format may be a 2EV3 packet format and the audio codec may be a mobile sub-band codec (mSBC). However, these are only exemplary. The 2EV3 packet format and the mSBC may be utilized in a manner consistent with conventional operations as those skilled in the art will understand.

The voice packet tracking engine 130 may track when voice packets are to be transmitted from the source device 105 to the sink device 195 and may also track results of transmitting these voice packets. Specifically, as the real time voice application is being executed by the real time voice engine 125, incoming audio data may be packaged as voice packets that are transmitted from the source device 105 to the sink device 195. As the Bluetooth connection is managed in accordance with a wireless protocol, the voice packets are transmitted based on a corresponding schedule so that the source device 105 and the sink device 195 can coordinate with respect to the communication of data.

The schedule for transmitting the voice packets over the Bluetooth connection may be based on a packet-based master-slave protocol, where the source device 105 may perform the functionality of a master and the sink device 195 may perform the functionality of a slave. In the piconet between the source device 105 and the sink device 195, the source device 105 and the sink device 195 may rely on a clock to establish the schedule. For example, the clock may be defined by the source device 105 and tick at intervals of 312.5 μs, such that a slot occupies two ticks lasting 625 μs and a frame represents a slot pair that occupies two slots lasting 1,250 μs. As a slot pair, the source device 105 may use a first slot (e.g., the odd slot) to transmit data. Accordingly, the sink device 195 uses the first slot to receive data. The source device 105 can then use the second slot (e.g., the even slot) to receive data, while the sink device 195 uses the second slot to transmit data. In this manner, both the source device 105 and the sink device 195 are allowed to exchange data in a transmission slot and a reception slot of a given frame. This one-slot symmetrical configuration, in which each slot lasts an identical duration, may be utilized such that voice packets are exchanged in six frame cycles, with voice instants of the real time voice application being transmitted every six frames. For illustrative purposes, the exemplary embodiments are described with regard to the one-slot symmetrical configuration.

The frame being a two slot pair is only exemplary. The exemplary embodiments may utilize any configuration and may be modified to accommodate the different slot configurations that the Bluetooth protocol allows. For example, other Bluetooth slot configurations may include a three-slot symmetrical configuration (e.g., in a six slot duration, a first slot lasts three times the duration of the one-slot symmetrical configuration at 1,875 μs and a second slot also lasts 1,875 μs), a three-slot asymmetrical configuration (e.g., in a six slot duration, a first slot lasts three times the duration of the one-slot symmetrical configuration at 1,875 μs and three slots thereafter lasts 625 μs each or vice versa), and a five-slot asymmetrical configuration (e.g., in a six slot duration, a first slot lasts five times the duration of the one-slot symmetrical configuration at 3,125 μs and one slot thereafter lasts 625 μs or vice versa).

Using the schedule, the source device 105 may coordinate with the sink device 195 to transmit and/or retransmit voice packets. After each transmission attempt (e.g., either the initial transmission attempt or any retransmission attempt), the voice packet tracking engine 130 may also track the corresponding result. Specifically, the voice packet tracking engine 130 may identify whether the transmission attempt resulted in the sink device 195 transmitting an ACK, the sink device 195 transmitting a NACK (e.g., an explicit NACK), or the source device 105 determining an implicit NACK (e.g., based on a certain event triggering such as a time out). As will be described in detail below, the output of the result from the voice packet tracking engine 130 may be used as an input to determine whether an ensuing frame is to be used for a retransmission attempt (when a NACK is received or determined) or whether the ensuing frame is available (when an ACK is received).

The precedent operation tracking engine 135 may track when precedent operations are to be performed based on the firmware instructions. As described above, the precedent operation may be a firmware based operation that has a priority over retransmission operations. As will be described in further detail below, the precedent operation may be a first scanning operation, an advertisement operation, or a second scanning operation. The precedent operation may be used in detecting other sink devices and/or establishing a Bluetooth connection with one of these detected other sink devices. As those skilled in the art will understand, in some implementations, the source device 105 may be configured to communicate with multiple (e.g., up to seven) sink devices. Thus, in addition to the sink device 195, the source device 105 may also communicate with multiple other (e.g., up to six) sink devices. Accordingly, the precedent operations may be used to establish these further Bluetooth connections or replace the Bluetooth connection with the sink device 195.

Under the Bluetooth protocol, the precedent operations may include a Bluetooth paging operation and/or a Bluetooth page scan operation. The Bluetooth paging/page scan operations may define or otherwise influence how the Bluetooth connection is established. For example, when a Bluetooth page is broadcast by a first device and received during a page scan performed by a second device, the two devices may subsequently perform connection operations to establish a Bluetooth connection. For illustrative purposes, the precedent operation may include the Bluetooth page scan operation and omit the Bluetooth paging operation.

Since the Bluetooth paging/page scan operations utilize a relatively large amount of power, the Bluetooth protocol may also utilize a Bluetooth advertising scheme in which low energy application profiles send and receive short pieces of data over a low energy link. The profiles may correspond to standards, which manufacturers may follow to allow devices to use specific technologies, such as Bluetooth, in the intended manner. One such advertising scheme has been defined as Bluetooth low energy (hereinafter referred to as "BLE") or "Bluetooth Smart". Compared to Classic Bluetooth (or Bluetooth Classic) that includes the Bluetooth paging/page scan operations, BLE is intended to provide considerably reduced power consumption and cost while maintaining a similar communication range, as well as reducing a time used by Bluetooth devices to identify proximity and capability of establishing a Bluetooth connection. Under BLE, the Bluetooth advertisement scheme may include a BLE advertisement operation and a BLE advertisement scan operation. The BLE advertisement/advertisement scan operations may define how devices detect one another so that the Bluetooth paging/page scan operations may be used to establish a Bluetooth connection. Specifically, when a BLE advertisement is broadcast by a first device and received during a BLE advertisement scan performed by a second device, the two devices may subsequently detect one another and proceed to the Bluetooth paging/page scan operations. For illustrative purposes, the precedent operations may include both the BLE advertisement operation and the BLE advertisement scan operation.

The precedent operations may be scheduled by the firmware at predetermined intervals. For example, the BLE advertisement operation may be performed every 181.25 ms (e.g., 290 slots). In another example, the BLE advertisement scan operation may be performed every 100 ms (e.g., 160 slots) for 10 ms (e.g., 16 slots). In a further example, the Bluetooth page scan operation may be performed at an R1 page scan repetition (SR) mode to perform a Bluetooth page scan every 1.28 seconds (e.g., 2,048 slots) or at an R2 page SR mode to perform a Bluetooth page scan every 2.56 seconds (e.g., 4,096 slots) for 10 ms (e.g., 16 slots). The predetermined intervals and/or instances at which the firmware schedules precedent operations is only exemplary and other predetermined or dynamic intervals or instances may also be used. The exemplary embodiments may be modified to accommodate other intervals at which the precedent operations may be scheduled by the firmware.

Based on the above predetermined intervals, the firmware may request that a precedent operation be scheduled to occur in a given frame. The precedent operation tracking engine 135 may identify the various frames for which the firmware has scheduled one or more precedent operations. As will be described in detail below, the output of the precedent operation tracking engine 135 may be used as an input to determine whether an ensuing frame has a scheduling conflict with a retransmission attempt.

The schedule engine 140 may dynamically select how an operation is scheduled in a given Bluetooth frame based on the outputs of the voice packet tracking engine 130 and the precedent operation tracking engine 135. In view of the predetermined intervals and instances at which the precedent operations may be performed, a retransmission operation and one of the precedent operations may be scheduled to occur in the same frame. For example, under the R1 page SR mode, at a multiple of the 1,024th frame (since the Bluetooth page scan is performed every 2,048 slots), a voice packet retransmission may also be requested during this frame (e.g., when a previous frame resulted in an explicit or implicit NACK). Under conventional procedures, the precedent operation is scheduled and the retransmission operation is not performed. At the same time, the retransmission, even though not attempted, still registers as one of the total transmission attempts (e.g., initial transmission attempt and up to two retransmission attempts). According to the exemplary embodiments, the schedule engine 140 may postpone the precedent operation to allow the retransmission operation to be performed, such that transmission of voice packets from the source device 105 to the sink device 195 may have a higher success rate.

Based on the outputs of the other engines 125-135, for a frame to be used for a voice packet retransmission operation, the schedule engine 140 may attempt scheduling at the beginning of a page scan. If the voice packet requires a retransmission attempt based on a previous NACK (e.g., explicit or implicit), the schedule engine 140 may schedule the retransmission operation for the current frame and the precedent operation may be postponed to the next frame. The schedule engine 140 may continue this process until all retransmission attempts are exhausted, if required. For example, with two retransmission attempts, the precedent operation may be postponed up to two frames. When the retransmission attempts are exhausted or not required (e.g., as a result of an ACK), the precedent operation may be scheduled and/or performed. Thus, under the 2EV3 packet format in which two retransmission attempts are used and with six frames between voice instants, a precedent operation may be scheduled in any/all of the five frames (when no retransmission attempt is required), four frames (when one retransmission attempt is required), or three frames (when two retransmission attempts are required) between voice instants.

The schedule engine 140 may be configured to run every frame to perform a determination as to whether the frame is to be used for a retransmission attempt or a precedent operation. In this manner, the exemplary embodiments provide a mechanism in which all of the available retransmission attempts may be used while allowing for an instantaneous precedent operation (e.g., the BLE advertisement operation) to be scheduled/performed at an earliest opportunity and also allowing for a lasting precedent operation (e.g., the Bluetooth page scan operation or the BLE advertisement scan operation) to be scheduled/performed at an earliest opportunity in a window that is as wide as possible, up to the intended duration. In utilizing the mechanism according to the exemplary embodiments, the probability of a successful voice packet transmission from the source device 105 to the sink device 195 in the three total transmission attempts is significantly improved, as the retransmission attempts will not be preempted by a precedent operation. This change in design results in a substantial improvement to audio quality of the actual audio received at the sink device 195 as well as a considerable improvement to an overall user experience.

Figure 2:
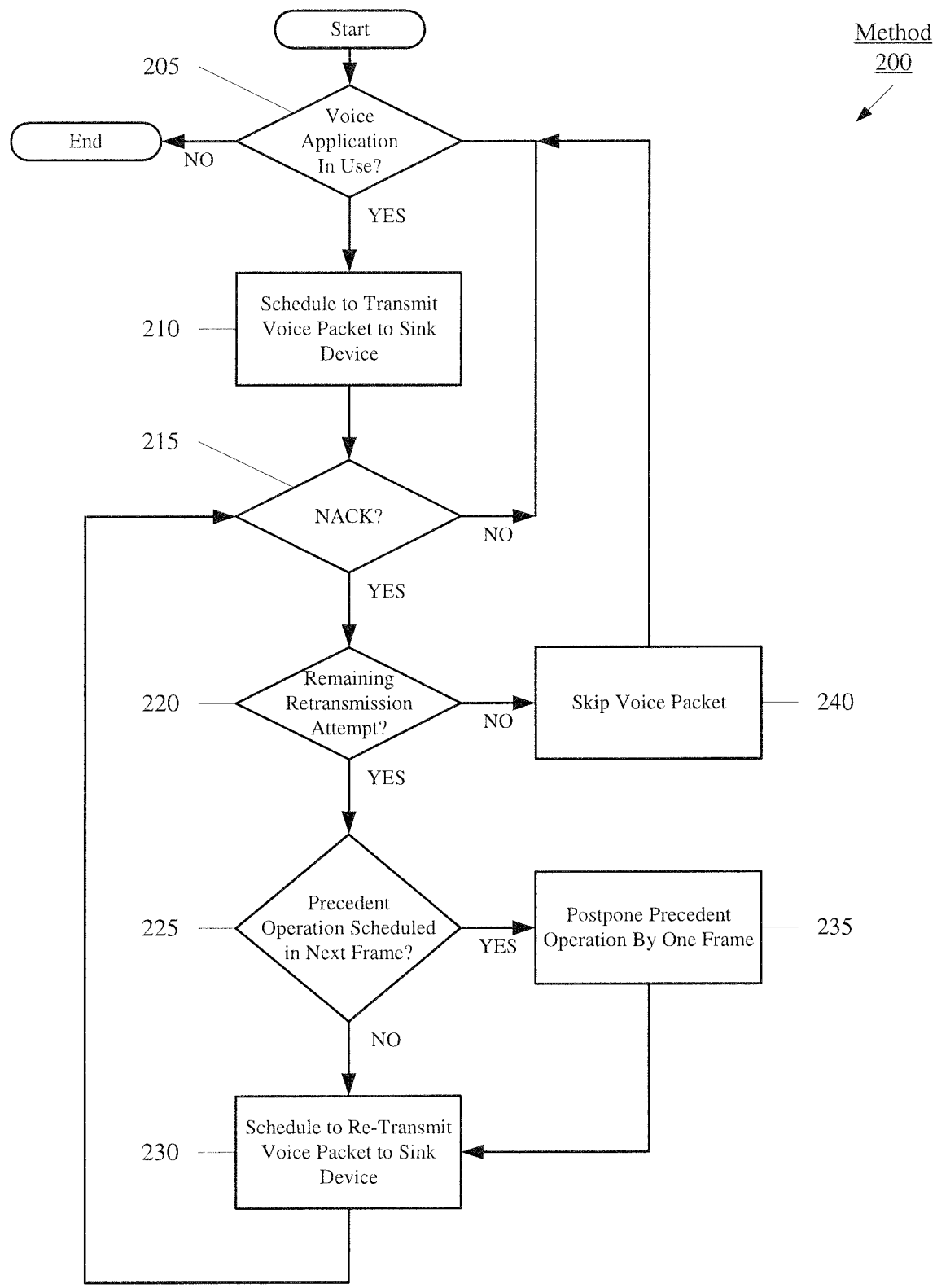
FIG. 2 shows an example method for dynamically scheduling voice packet retransmissions and precedent operations according to various exemplary embodiments described herein.

FIG. 2 shows an example method 200 for dynamically scheduling voice packet retransmissions and precedent operations according to various exemplary embodiments described herein. The method 200 relates to how the source device 105 can track voice packet transmissions and precedent operations (e.g., firmware operations), according to a schedule including Bluetooth frames to determine how a frame is to be scheduled with a corresponding operation. The method 200 is performed by the source device 105 and will be described with regard to the system 100 of FIG. 1.

In 205, the source device 105 determines if a real time voice application is being used. As described above, the real time voice engine 125 may execute a real time voice application in a variety of different manners to allow a user of the source device 105 to communicate in real time with a called device. As the exemplary embodiments are described with regard to real time voice packets being transmitted from the source device 105 to the sink device 195, the use of the real time voice application may indicate whether the mechanism according to the exemplary embodiments is to be used. However, the real time voice application is only exemplary and data transmitted from the source device 105 to the sink device 195 may be any type of packet that is prioritized lower than the precedent operation. When a real time voice application is in use, the source device 105 continues to 210.

In 210, the source device 105 schedules an initial transmission operation of a voice packet to the sink device 195. In an exemplary implementation, the initial transmission operation may be scheduled in an unhindered manner to substantially maintain the real time aspect of the real time voice application.

In 215, the source device 105 determines whether the initial transmission operation resulted in an ACK or a NACK. When the initial transmission operation successfully transmitted the voice packet from the source device 105 to the sink device 195, the remaining scheduling functionality may be performed in a conventional manner. Accordingly, the source device 105 returns to 205. A precedent operation may be scheduled without interfering with a retransmission attempt. Alternatively, the initial transmission operation may have failed and the voice packet may not have been successfully received by the sink device 195. The resulting NACK may be an explicit NACK, in which the sink device 195 transmits a NACK, or an implicit NACK, in which the source device 105 determines that the sink device 195 likely did not receive the voice packet during the initial transmission operation. When a NACK is determined, the source device 105 continues to 220.

In 220, the source device 105 determines if there are any remaining retransmission attempts that are available for use to retransmit the voice packet. In the present example, since the NACK corresponds to the initial transmission operation and there are two remaining retransmission attempts, the source device 105 continues to 225.

In 225, the source device 105 determines whether a precedent operation is scheduled for the next frame, which also would be used to schedule the retransmission operation. For example, the precedent operation may be a Bluetooth page scan operation, a BLE advertisement operation, or a BLE advertisement scan operation. The precedent operation may conventionally have a higher priority than the retransmission operation. When a precedent operation is not scheduled to occur in the next frame, the source device 105 continues to 230 where the retransmission operation is scheduled for the NACK'ed voice packet. When a precedent operation is scheduled for the next frame, the source device 105 continues to 235 where the precedent operation is postponed by at least one frame. The source device 105 then proceeds to 230 to schedule the retransmission operation.

After 230, the source device 105 returns to 215 to determine if the first retransmission attempt resulted in a NACK. The source device 105 may proceed in a substantially similar manner as described above after the initial transmission operation has been performed. Thus, if the first retransmission operation resulted in an ACK, the source device 105 returns to 205. Any precedent operation that was postponed may also be scheduled. However, if the first retransmission operation resulted in a NACK, the source device 105 continues to 220. As there is one more transmission attempt (e.g., two total retransmission attempts), the source device continues to 225. Again, if a precedent operation is not slated for the next frame, the source device 105 continues to 230. If a precedent operation is slated for the next frame, the source device 105 continues to 235 then to 230.

After this pass of 230, the source device 105 returns to 215 to determine if the second retransmission attempt resulted in a NACK. The source device 105 may proceed in a similar manner as described above after the first retransmission operation has been performed. If the second retransmission operation resulted in an ACK, the source device 105 returns to 205. In this instance, if the second retransmission operation resulted in a NACK, the source device 105 has exhausted all transmission attempts and continues to 240. In 240, the source device 105 skips (or drops) the voice packet. That is, the voice packet that failed to be transmitted from the source device 105 to the sink device 195 is dropped by the source device 105. The source device 105 then returns to 205. Any precedent operation that was postponed may also be scheduled in the next frame upon dropping the voice packet.

The exemplary embodiments provide a device, system, and method of dynamically scheduling an operation for each frame during a real time voice application. For example, when a precedent operation and a retransmission operation (e.g., for a voice packet of the real time voice application) are both to be performed in the same frame, the mechanism according to the exemplary embodiments may delay the precedent operation to allow the retransmission operation to be scheduled/performed in an unhindered manner. In this way, one or more retransmission opportunities for a real time application may be used, despite a conflict with a precedent operation, to increase the probability that voice packets will be successfully transmitted and received, improving application performance and user experience.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
    at a source device connected to a sink device over a first wireless connection:
    identifying a frame for retransmitting a voice packet associated with a real time application from the source device to the sink device;
    determining that a precedent operation is scheduled for the frame;
    delaying the precedent operation to a subsequent frame, following the retransmitting of the voice packet; and
    scheduling a retransmission operation for retransmitting the voice packet during the frame.

2. The method of claim 1, wherein the real time application is one of a voice application or a video application.

3. The method of claim 1, wherein the source device is connected to a second device over a second wireless connection.

4. The method of claim 1, further comprising:
    determining, following the frame, that an additional retransmission operation is not allowed; and
    determining to drop the voice packet.

5. The method of claim 1, wherein the precedent operation comprises a firmware-based operation.

6. The method of claim 5, wherein the precedent operation is one of a page scan operation, an advertisement operation, or an advertisement scan operation.

7. The method of claim 1, wherein the subsequent frame immediately follows the frame.

8. The method of claim 1, wherein the first wireless connection comprises a Bluetooth connection.

9. A source device, comprising:
    a transceiver configured to establish a connection to a sink device over a first wireless connection; and
    a processor configured to execute a set of instructions stored on a computer readable storage medium, wherein the set of instructions include:
    identifying a frame for retransmitting a voice packet associated with a real time application from the source device to the sink device,
    determining that a precedent operation is scheduled for the frame,
    delaying the precedent operation to a subsequent frame, following the retransmitting of the voice packet, and
    scheduling a retransmission operation for retransmitting the voice packet during the frame.

10. The source device of claim 9, wherein the real time application is one of a voice application or a video application.

11. The source device of claim 9, wherein the transceiver is further configured to connect to a second device over a second wireless connection.

12. The source device of claim 9, wherein the processor is further configured to determine, following the frame, that an additional retransmission operation is not available and determine to drop the voice packet.

13. The source device of claim 9, wherein the precedent operation comprises a firmware-based operation.

14. The source device of claim 13, wherein the precedent operation is one of a page scan operation, an advertisement operation, or an advertisement scan operation.

15. The source device of claim 9, wherein the subsequent frame immediately follows the frame.

16. The source device of claim 9, wherein the first wireless connection comprises a Bluetooth connection.

17. An integrated circuit configured for use in a source device connected to a sink device over a first wireless connection, comprising:
    circuitry configured to identify a frame for retransmitting a voice packet associated with a real time application from the source device to the sink device;
    circuitry configured to determine that a precedent operation is scheduled for the frame;
    circuitry configured to delay the precedent operation to a subsequent frame following the retransmitting of the voice packet; and
    circuitry configured to schedule a retransmission operation for retransmitting the voice packet during the frame.

18. The integrated circuit of claim 17, wherein the real time application is one of a voice application or a video application.

19. The integrated circuit of claim 17, further comprising:
    circuitry configured to determine, following the frame, that an additional retransmission operation is not available and determine to drop the voice packet.

20. The integrated circuit of claim 17, wherein the precedent operation is one of a page scan operation, an advertisement operation, or an advertisement scan operation.

* * * * *